Patented Aug. 18, 1936

2,051,473

UNITED STATES PATENT OFFICE 2,051,473

PRODUCTION OF ALKYLATED PHENOLIC BODIES

Theodore Evans and Karl R. Edlund, Berkeley, Calif., assignors to Shell Development Company, San Francisco, Calif., a corporation of Delaware No Drawing. Application April 29, 1933, Serial No. 668,625

24 Claims. (Cl. 260—154)

In the addition of tertiary olefines to phenols to produce the corresponding phenolic bodies, it has been customary to employ either relatively large quantities of acetic acid and sulfuric acid or large amounts of sulfuric acid per se.

The use of acetic acid has the disadvantage that it requires an added treatment of the reaction product to destroy the acetylated phenol which results from the interaction of phenol with acetic acid. The use of large quantities of sulfuric acid, on the other hand, has led to the production of sulfonated phenols. From both of these practiced methods, one has obtained phenol-ethers in large quantities as well as polymerized olefines.

We have discovered that phenolic bodies, that is, isocyclic bodies which contain one or more isocyclic nuclei and at least one hydroxy group, can be simply, easily, quickly and economically alkylated with unsaturated hydrocarbons which contain a double bond adjacent to a tertiary carbon atom, i. e. a carbon atom linked to three other carbon atoms, as can be found in certain olefines, diolefines, etc.

Instead of following the teachings of the prior art, we deviate therefrom in that we resort to true catalytic quantities of the acid condensing agent to be employed. As suitable acid condensing agents may be mentioned sulfuric acid and phosphoric acid which are mineral acids as well as polybasic acids, hydrochloric acid, etc.

The reaction may or may not be carried out in the presence of an inert solvent or solvent mixture, especially when one of the reaction components happens to be solid at ordinary or increased temperature. The solvent employed not only facilitates the reaction, but also prevents secondary reactions. The yield of the desired condensation product is often favored by using an inert solvent, that is to say, a solvent which does not react with the acid catalyst, or the unsaturated hydrocarbon or the phenolic compound. Suitable solvents of this kind are, for example, saturated aliphatic hydrocarbons, such as petroleum ether, petroleum benzine, paraffin oil, or completely hydrogenated aromatic hydrocarbons, such as hexahydrobenzene, hexahydrotoluene, decahydronaphthalene and the like, carbon tetrachloride, etc. Also, the phenolic body, if solid at ordinary temperatures, can be heated up to its liquefaction temperature, provided it melts at moderately elevated temperatures, and subsequently or simultaneously treated with the tertiary olefine and catalyst.

The temperatures at which the condensation is practicable can be varied within wide limits; in individual cases the reaction proceeds already at the ordinary temperature (20° C.), however, it is advantageously accelerated by the application of elevated temperatures. Too high a temperature should be avoided otherwise the alkyl group splits off the nuclear carbon atom and is polymerized, at the same time the unsaturated reactants undergo polymerization. The temperature should be adjusted to the character and concentration of the acid catalyst, the character of the unsaturated hydrocarbon and the nature of the phenolic body.

The pressure employed is that of the mixture at the reaction temperature. The use of increased pressure considerably facilitates the reaction and favors the formation of higher condensation products.

It is not necessary to use the tertiary olefines, individually or in a very concentrated state; the reaction may be effected with mixtures containing olefines, such as, for example, the mixtures resulting from the cracking of mineral oil and its products, oil gas and the like, or may be carried out with a mixture of tertiary olefines per se.

The fact that tertiary olefines react very readily with phenolic bodies in the presence of acid condensing agents can be availed of in selectively removing the tertiary olefine content from hydrocarbon mixtures containing the same. The hydrocarbon mixtures can be first fractionated so as to obtain a mixture which predominates in hydrocarbons containing the same number of carbon atoms to the molecule as a mixture of 4 and 5 carbon hydrocarbons or one which is essentially a mixture of hydrocarbons containing, for example, only four, five or six carbon atoms to the molecule. For example, in reacting a hydrocarbon mixture of butene-1, butene-2, isobutylene, isobutane and butane, the secondary olefine content will react extremely slowly with phenol whereas isobutylene will react almost instantly under the identical conditions. The same is true with a pentane-amylene fraction containing tertiary amylene and with a similar hexane-hexylene fraction, etc.

The ratio tertiary olefine: phenolic body can varyl from slightly less than 1, to 5 and more. The lower ratio is conducive to monoalkyl derivatives while the higher ratios are conducive to polyalkyl derivatives. The exact ratio depends upon the degree of alkylation desired and upon the number of available carbon atoms in the nucleus or nuclei which are capable of taking up an alkyl group. In actual operation we prefer to employ a slight excess of the tertiary olefine for the product desired in order to compensate for slight losses of tertiary olefine which may occur.

The ratio of mols phenolic body to mols acid catalyst can be varied within wide limits while employing the latter in catalytic amounts. We have successfully employed a ratio of 15:1, 30:1 and higher with good reaction velocities.

Amongst the available phenolic bodies may be listed, phenol, the cresols, carvacrol, thymol, the naphthols, pyrocatechol, resorcinol, quinol, pyrogallol, phloroglucinol, xylenol, guaiacol, orcinol, mesitol, pseudocumenol, toluhydroquinone, hydroquinone, etc. Low temperature tar phenols and mixtures of phenolic compounds may be utilized, such as are, for example, contained in tar oils or alcohols, such as benzyl alcohol or acids, such as acetic acid. The phenolic compounds can be used in the pure state, as crude material and as technical mixtures.

The invention is illustrated by the following examples, but is not restricted thereto:

Example I 300 gm. phenol (3.2 mols), 252 gm. isobutylene (4.5 mols) and 18 gm. $H_2SO_4$ (0.18 mols) are reacted one hour at 90° C. The mixture is cooled, diluted with ether to reduce its viscosity, and washed with water, dilute sodium bicarbonate, and again with water. It is then vacuum distilled at 2.5 mm. in the presence of a small piece of calcium carbonate. Upon fractionating there is obtained 135 gm. crystalline para tertiary butyl phenol, 65 gm. of a mixture of probably ortho and para tertiary butyl phenol and 280 gm. of polybutyl phenols as well as 40 gm. unreacted phenol. The polybutyl phenols can be smoothly decomposed to para tertiary phenol by vacuum distillation in the presence of a trace of acid. In this way, the para tertiary alkyl phenolic compounds can be made the chief product of the reaction, provided the temperature, acidity and time of contact are adjusted to prevent the regeneration of the phenolic bodies. Too much acid, too high a temperature or too long contact time will produce complete decomposition to the original phenolic body.

Example II

The reaction is carried on as above, except that only 0.1 mol $H_2SO_4$ is employed, and a temperature of 100° to 110° C. maintained. The product is worked up similarly, except that in place of the calcium carbonate, 0.2 cc. $H_2SO_4$ is added to the kettle. At 25 to 30 mm. the following yield results:

Crystalline phenol, 25 gm.
Intermediate liquid cut (probably o & p tertiary butyl phenol), 100 gm.
Crystalline para tertiary butyl phenol, 300 gm.

The still bottoms amount to about 5 gm. and are crystalline, though impure, para tertiary butyl phenol. Distilling in the presence of $H_2SO_4$ or other acid, preferably a small amount, any tertiary butyl phenyl ether which might have formed, rearranges very readily to para tertiary butyl phenol.

Example III 2.9 mols isobutylene, 2.8 mols meta cresol, and 0.1 mols $H_2SO_4$ are reacted at 20° C. from 40 to 80 minutes. Upon treating as previously described in Example I, there are obtained 37% of the cresol unchanged, 33% as para tertiary butyl meta cresol, and 29% as dibutyl meta cresol. This last compound is crystalline, has a melting temperature 62° to 63° C., a boiling temperature about 144° C. at 4 mm., a molecular weight in benzene equal to 224 and analyzed: $C=81.8\%$, $H=11.4\%$, $O=6.8\%$. It is insoluble in aqueous caustic and hence may be the tertiary butyl ether of para tertiary butyl meta cresol. It may be decomposed by acid in the same fashion as the polybutyl phenols previously described so that the main product of the reaction can be made the monotertiary butyl derivative, if desired.

Example IV 2 mols resorcinol, 4.5 mols isobutylene, and 0.2 mols $H_2SO_4$ were put together. The reaction is strongly exothermic, heating spontaneously to about 100° C. The mixture was stirred for 10 minutes, and then drained. A solid material was obtained on cooling, which, when crystallized from toluene and dried over $H_2SO_4$, melted at 122° to 123° C., and analyzed as 1 resorcinol + $2C_4H_8$.

Example V 0.28 mols of phosphoric acid were added to 3.3 mols of melted phenol. This immediately produced a white precipitate. The mixture was introduced into an autoclave as completely as possible and reacted with 3.3 mols isobutylene for one hour at 75-80° C. At the end of this time practically all the butylene was absorbed; the tertiary butyl phenol was isolated possessing a melting point of 95-97° C.

Example VI

Phenol (1.6 mols), sulfuric acid (0.18 mols) and a pentane-amylene fraction (containing 1.9 mols tertiary amylene) were reacted at 75° C. for one hour. At the end of the reaction only one phase was present, of a cherry-red color. It was steam distilled in the presence of alkali to remove the residual pentane and secondary amylene and then vacuum distilled. The tertiary amylenes were completely removed from the hydrocarbon fraction by this treatment.

It may be herein noted that, in resorting to phenolic bodies in selectively removing tertiary olefines from their hydrocarbon mixtures, organic acid condensing agents as well as inorganic condensing agents may be employed in catalytic amounts. For example, benzene sulfonic acid, its homologues, naphthalene sulfonic acid, its homologues, and the like can also be employed.

It is preferable to employ the acid condensing agent in a concentrated state. For example, in resorting to sulfuric acid, it is preferable to employ one of at least 90% concentration and stronger, but even more dilute acid also gives satisfactory results. It is not possible to indicate by definite figures the lower and upper limits of concentration of the acid condensing agent used because these limits depend on the nature of the tertiary olefine and of the phenolic body which take part in the reaction.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories which we have advanced as to the reasons for the advantageous results attained. On the other hand, the invention is to be regarded as limited only by the terms of the accompanying claims, in which it is our intention to claim all novelty inherent therein as broadly as is possible in view of the prior art.

We claim as our invention:

1. A process for preparing alkylated phenolic bodies which comprises reacting with a tertiary olefine upon an aromatic carbocyclic body hydroxylated in the nucleus in the presence of a catalytic amount of a mineral acid condensing agent.

2. A process for preparing alkylated phenolic bodies which comprises reacting with a tertiary olefine upon an aromatic carbocyclic body hydroxylated in the nucleus in the presence of a catalytic amount of sulfuric acid.

3. A process for preparing alkylated phenolic bodies which comprises reacting with a tertiary olefine upon an aromatic carbocyclic body hydroxylated in the nucleus in the presence of a catalytic amount of phosphoric acid.

4. A process for preparing alkylated phenolic bodies which comprises reacting with an excess of tertiary olefine upon an aromatic carbocyclic body hydroxylated in the nucleus in the presence of a catalytic amount of a mineral acid condensing agent.

5. A process for preparing alkylated phenolic bodies which comprises reacting with a tertiary olefine upon an aromatic carbocyclic body hydroxylated in the nucleus in the presence of a catalytic amount of a mineral acid condensing agent and of an inert solvent.

6. A process for preparing alkylated phenolic bodies which comprises reacting with a tertiary olefine upon an aromatic carbocyclic body hydroxylated in the nucleus in the presence of a catalytic amount of a mineral acid condensing agent at an elevated temperature.

7. A process for preparing alkylated phenolic bodies which comprises reacting with a tertiary olefine upon an aromatic carbocyclic body hydroxylated in the nucleus in the presence of a catalytic amount of a mineral acid condensing agent under superatmospheric pressure.

8. A process for preparing alkylated phenolic bodies which comprises reacting an aromatic carbocyclic body hydroxylated in the nucleus with a hydrocarbon mixture containing tertiary olefines in the presence of a catalytic amount of a mineral acid condensing agent and removing the alkylated phenolic body from the treated mixture.

9. A process for preparing alkylated phenolic bodies which comprises reacting an aromatic carbocyclic body hydroxylated in the nucleus with a hydrocarbon fraction consisting predominately of hydrocarbons containing the same number of carbon atoms to the molecule and which also contain tertiary olefine in the presence of a catalytic amount of a mineral acid condensing agent, and removing the alkylated phenolic body from the treated mixture.

10. A process for preparing alkylated phenolic bodies which comprises reacting an aromatic carbocyclic body hydroxylated in the nucleus with a mixture of hydrocarbons which predominately contain four carbon atoms to the molecule and which also contain tertiary butylene in the presence of a catalytic amount of a mineral acid condensing agent.

11. A process for preparing alkylated phenolic bodies which comprises reacting an aromatic carbocyclic body hydroxylated in the nucleus with a mixture of hydrocarbons which predominately contain five carbon atoms to the molecule and which also contain tertiary amylene in the presence of a catalytic amount of a mineral acid condensing agent.

12. A process for preparing alkylated phenolic bodies which comprises reacting an aromatic carbocyclic body hydroxylated in the nucleus with a mixture of hydrocarbons which contain the same number of carbon atoms to the molecule and which also contain tertiary olefine in the presence of a catalytic amount of sulfuric acid.

13. A process for preparing alkylated phenolic bodies which comprises reacting an aromatic carbocyclic body hydroxylated in the nucleus with a mixture of hydrocarbons which contain the same number of carbon atoms to the molecule and which also contain tertiary olefine in the presence of a catalytic amount of sulfuric acid at an elevated temperature.

14. A process for preparing alkylated carbocyclic bodies hydroxylated in the nucleus which comprises reacting a plurality of tertiary olefine molecules upon an aromatic carbocyclic body hydroxylated in the nucleus and subsequently heating the polyalkylated phenolic body in the presence of a catalytic amount of mineral acid to obtain a mono tertiary alkyl phenolic body.

15. A process for preparing alkylated carbocyclic bodies hydroxylated in the nucleus which comprises reacting a plurality of tertiary olefine molecules upon an aromatic carbocyclic body hydroxylated in the nucleus and subsequently distilling the polyalkylated phenolic body under superatmospheric pressure in the presence of a catalytic amount of mineral acid to obtain a mono tertiary alkyl phenolic body.

16. The step of distilling a poly tertiary alkylated aromatic carbocyclic body hydroxylated in the nucleus in vacuo in the presence of a catalytic amount of acid.

17. The step of distilling a poly tertiary alkylated aromatic carbocyclic body hydroxylated in the nucleus in vacuo in the presence of a trace of sulfuric acid.

18. The process which comprises reacting tertiary butylene with an aromatic carbocyclic body hydroxylated in the nucleus in the presence of a catalytic amount of sulfuric acid.

19. The process which comprises reacting tertiary amylene with an aromatic carbocyclic body hydroxylated in the nucleus in the presence of catalytic amount of sulfuric acid.

20. A process for preparing alkylated phenolic bodies which comprises reacting an aromatic carbocyclic body hydroxylated in the nucleus with a hydrocarbon mixture containing both secondary and tertiary olefine hydrocarbons in the presence of a catalytic amount of mineral acid for a time and at a temperature so that substantially only the tertiary olefine content is reacted and removing the tertiary alkylated phenolic body from the treated mixture.

21. A process for preparing alkylated phenolic bodies which comprises reacting an aromatic carbocyclic body hydroxylated in the nucleus with a hydrocarbon mixture containing both secondary and tertiary olefine hydrocarbons in the presence of a condensing agent for a time and at a temperature so that substantially only the tertiary olefine content is reacted.

22. A process for preparing alkylated phenolic bodies which comprises reacting an aromatic carbocyclic body hydroxylated in the nucleus with a hydrocarbon mixture containing both secondary and tertiary olefine hydrocarbons in the presence of an acid condensing agent for a time and at a temperature so that substantially only the tertiary olefine content is reacted.

23. A process for preparing alkylated phenolic bodies which comprises reacting an aromatic carbocyclic body hydroxylated in the nucleus with a hydrocarbon mixture containing both secondary and tertiary olefine hydrocarbons in the presence of a catalytic amount of a condensing agent for a time and at a temperature so that substantially only the tertiary olefine content is reacted.

24. A process for preparing monoalkylated phenolic bodies which comprises heating the corresponding polyalkylated aromatic carbocyclic body hydroxylated in the nucleus in the presence of a mineral acid catalyst for a time whereby the monoalkylated phenolic body is formed.

THEODORE EVANS.
KARL R. EDLUND.